United States Patent [19]

Veglia

[11] Patent Number: 4,618,130
[45] Date of Patent: Oct. 21, 1986

[54] RESILIENT BLOCK FOR ATTACHING THE UPPER END OF A FRONT SUSPENSION SHOCK ABSORBER TO A VEHICLE BODY

[75] Inventor: Bartolomeo Veglia, Turin, Italy

[73] Assignee: Riv-Skf Officine Di Villar Perosa S.p.A., Torino, Italy

[21] Appl. No.: 619,361

[22] Filed: Jun. 11, 1984

[30] Foreign Application Priority Data

Jun. 23, 1983 [IT] Italy .................... 53494/83[U]

[51] Int. Cl.$^4$ ............................................. F16F 1/36
[52] U.S. Cl. ............................ 267/153; 188/321.11; 267/8 R; 267/33; 267/63 A; 280/668; 384/611
[58] Field of Search ............. 267/63 A, 33, 35, 152, 267/153, 8 R; 188/321.11; 280/697, 688, 692, 668; 384/611

[56] References Cited

U.S. PATENT DOCUMENTS

| 3,042,393 | 7/1962 | Heiss et al. | 267/35 |
|---|---|---|---|
| 4,210,343 | 7/1980 | Shiomi et al. | 267/33 X |
| 4,274,655 | 7/1981 | Lederman | 280/688 |
| 4,477,061 | 10/1984 | Kawaura | 267/33 X |
| 4,497,523 | 2/1985 | Lederman | 280/668 X |

FOREIGN PATENT DOCUMENTS

| 2820585 | 11/1979 | Fed. Rep. of Germany | 280/692 |
|---|---|---|---|
| 2229566 | 12/1974 | France | 267/8 R |
| 2514303 | 4/1983 | France | 267/33 |

Primary Examiner—George E. A. Halvosa
Attorney, Agent, or Firm—Omri M. Behr

[57] ABSTRACT

The resilient block serves to connect a stem of a shock absorber of a suspension of a vehicle to the body thereof and is provided with a rolling element bearing keyed to the stem and provided with an outer ring having an annular groove on its outer cylindrical surface, engaged by an inner rim of a first frusto-conical support sleeve, a second frusto-conical support sleeve which can be fitted to the body, and an elastomeric sleeve directly vulcanized onto the outer lateral surfaces of the outer ring of the bearing and the associated frusto-conical sleeve and to the inner surface of the second sleeve to form a single indivisible unit.

5 Claims, 2 Drawing Figures

RESILIENT BLOCK FOR ATTACHING THE UPPER END OF A FRONT SUSPENSION SHOCK ABSORBER TO A VEHICLE BODY

BACKGROUND OF THE INVENTION

The present invention relates to a resilient block for attaching the upper end of a front suspension shock absorber to the body of a vehicle, in particular of the type which allows steering of the vehicle wheels without causing stresses to the suspension spring thereof.

It is known that in order to connect the shock absorber of a steering wheel of a motor vehicle to the motor vehicle body particular resilient blocks are used comprising a rolling element bearing fitted to the interior of a resiliently deformable bush constituted by two sleeves or rigid support elements, respectively an inner element and an outer element, joined together by a deformable intermediate sleeve made of elastomeric material vulcanised and adhered onto the facing surfaces of the inner and outer sleeve; the rolling element bearing can be fitted with its inner ring on the stem of the shock absorber and with its outer ring on the inner rigid sleeve of the deformable bush, which outer sleeve is then fixed to the vehicle body by means of bolts.

A resilient support of the type described above is not entirely free from disadvantages; in particular the presence of two separate units (resilient bush and bearing) usually made by two separate manufacturers and then assembled by a third agency (for example the utilising concern) creates problems of assembly and increases the assembly time; moreover because of different working tolerances play and/or assembly imperfections between the bearing and the resilient bush can occur. For the purpose of overcoming these disadvantages resilient blocks have been proposed in which the inner rigid sleeve is eliminated and the elastomeric sleeve is directly vulcanised onto the outer surface of the outer ring of the bearing, in such a way as to create a single unit which is made and sold directly by the bearing producer; this second solution however, has the disadvantage of requiring the utilisation of special bearings having an outer ring of particular form and of a length greater than that of the inner ring in order to provide sufficient anchorage for the elastomeric sleeve; moreover, because of the limitations on the form imposed by the dual function which the outer ring of the bearing must perform, this latter ends up being shaped in such a way as to transmit predominantly shear stresses to the elastomeric sleeve with a reduction in the efficiency of the elastomeric sleeve itself.

SUMMARY OF THE INVENTION

The object of the present invention is to provide a resilient block for attaching the upper end of a front suspension shock absorber of a vehicle to the body thereof, substantially of the second type described above but free from the first mentioned disadvantages.

The said object is achieved by the present invention in that it relates to a resilient block for attaching the upper end of a front suspension shock absorber of a vehicle to the body thereof, of the type comprising a rolling element bearing an inner ring of which can be fitted to one end of a stem of the said shock absorber, a first support element which can be securely fixed to the said body, and a resilient sleeve operable resiliently to connect the said rolling element bearing and the said first support element to allow relative movement of the shock absorber with respect to the vehicle body, characterised by the fact that an outer ring of the said rolling element bearing is provided on its outer cylindrical surface with attachment means for a second support element coaxial with the first and with the said rolling element bearing, the said outer cylindrical surface of the outer ring of the bearing, an outer lateral surface of the said second element and an inner lateral surface of the said first element being directly and firmly connected to the said elastomeric sleeve in such a way that the said outer ring and the said first and second support element form with the said sleeve a single substantially inseparable unit.

BRIEF DESCRIPTION OF THE DRAWINGS

For a better understanding of the present invention, a non-limitative embodiment thereof will now be described by way of example, with reference to the attached drawings, in which.

DETAILED DESCRIPTION OF THE INVENTION

Figure 1:
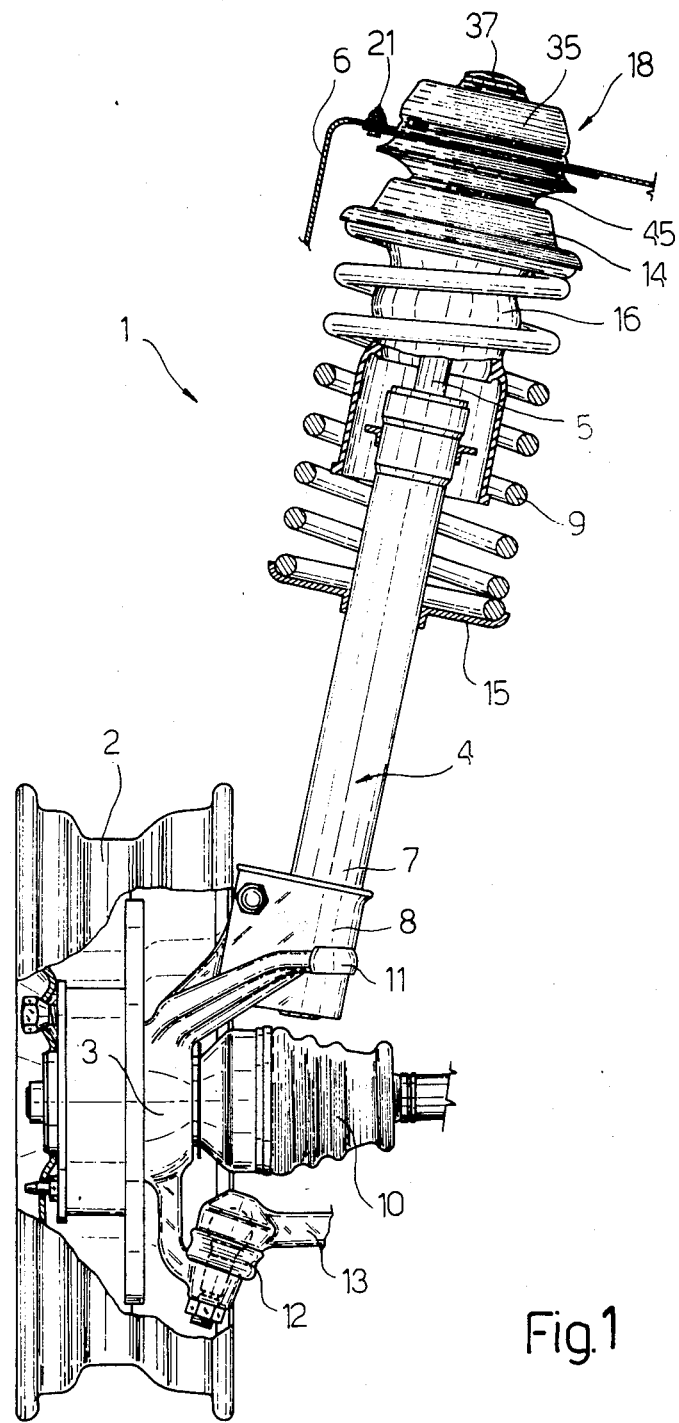
FIG. 1 partially illustrates a front suspension of a vehicle provided with a resilient block formed according to the principles of the present invention.

With reference to FIG. 1 a suspension for a front steering wheel 2 of a vehicle not illustrated, for example a motor vehicle, is generally indicated with the reference numeral 1. The suspension 1 is of the McPherson type and includes, as is known, a mounting 3, a shock absorber 4 provided with a stem 5 connected to a body 6 of the said vehicle and to a body 7 connected to an attachment 8 of the mounting 3, and a coil spring 9 mounted externally of the shock absorber 4. The wheel 2 receives drive from a coupling 10 and is steered by making the mounting 3 which supports it turn by means of a rod, not illustrated connected to an attachment 11 of the mounting 3. This latter is further provided with a ball joint 12 to which is linked a support bar 13 connected in a known way and not illustrated to the body 6 and to a known and not illustrated torsion bar.

The shock absorber 4 is provided with two facing end caps 14 and 15, respectively fixed to the stem 5 and to the body 7 and between which the spring 9 is mounted; to the end cap 14 is fixed a protection sleeve 16 for the stem 5. The end cap 14 is able to transfer stresses bering on the suspension 1 to the body 6 and vice versa through a resilient attachment block 18 which is fitted onto the stem 5 by any convenient means, for example (see FIG. 2) by means of a nut 19 screwed onto a threaded section 20 of the stem 5 itself, and is fixed to the body 6 directly or indirectly, for example by means of bolts 21.

Figure 2:
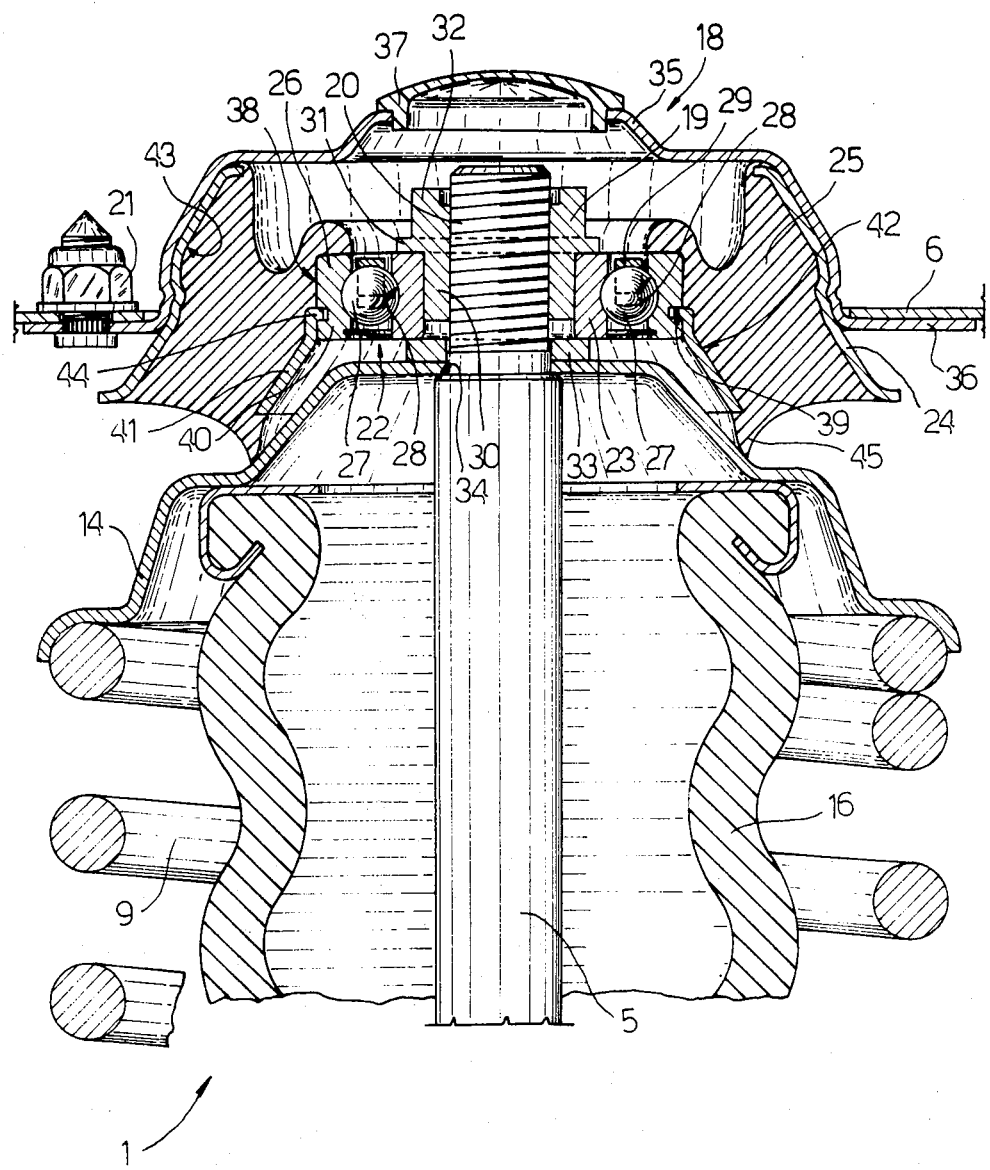
FIG. 2 illustrates on an enlarged scale a sectioned view of a detail of the suspension of FIG. 1 including the said block.

With reference to FIG. 2, the resilient block 18 includes a rolling element bearing 22 an inner ring 23 of which can be fixed in a non-rotatable manner to the end or threaded section 20 of the stem 5, a first annular support element 24 substantially in the form of a frusto-conical sleeve and preferably made from pressed sheet metal, and a resiliently deformable elastomeric sleeve 25 which resiliently joins the bearing 22 to the element 24, and which can be connected in turn to the body 6 to allow relative movements of the shock absorber 4 with respect to the body 6 itself; the bearing 22 includes an inner ring 23, an outer substantially cylindrical ring 26 like the ring 23 and coaxial to this latter, and a plurality of rolling bodies 27 interposed between the rings 23 and 26 in such a way as to be able to roll between respective facing tracks 28 thereof and disposed within a spacer cage 29.

In the embodiment illustrated in FIG. 2 the nut 19 is shaped in such a way as to have a substantially cylindrical axial sleeve 30 which extends coaxially of the section 20 towards the end cap 14, and a collar 31 forming a radial shoulder projecting from the nut 19 and interposed between the sleeve 30 and a head 32 of the nut; the inner ring 23 of the bearing 22 is fitted onto the sleeve 30 and axially locked thereon by means of the shoulder 31 and a spacer ring 33 interposed between the inner ring 23 and the end cap 14, which rests in turn against a shoulder 34 of the stem 5. The bearing 22 must be of a type which can support both radial and axial stresses, and can therefore be of the ball bearing type having deep grooves as illustrated in FIG. 2, or else of another equivalent type. The support element or frusto-conical sleeve 24 can be provided with an attachment flange not illustrated in order to be fixed directly to the body 6, or else may be snap-engageable with a hood 35 of substantially cup-shape provided with an attachment flange 36 which allows the fixing thereof to the body 6 by means of bolts 21; such characteristic is known. The cover or hood 35 is further able to serve as an abutment stop for the block 18 in such a way as to limit possible axial translation of the bearing 22 and of the stem 5 rigidly connected to it, and can be provided with a protection cover 37.

According to the invention the outer ring 26 is provided on its outer cylindrical surface 38 with an annular groove 39 which in the non-limitative illustrative example is formed at a lower end 40 of the ring 26 facing towards the shock absorber 4, and the block 18 includes, as well as the element 24, the bearing 22 and the sleeve 25, a further second annular support element 41 of substantially frusto-conical sleeve form, which is disposed substantially coaxially with the sleeve 24; the annular element or frusto-conical sleeve 41 is delimited externally by an outer substantially conical lateral surface 42 which is substantially coaxial with the surface 38 and faces and is coaxial with a lateral inner substantially conical surface 43 of the annular element or frusto-conical sleeve 24. The annular element or sleeve 41 is rigidly connected to the outer ring 26 externally thereof by means of a radially inner folded annular edge 44 engaged within the annular groove 39 and, in the particular example illustrated, projects beyond the lower end 40 towards the end cap 14 with its narrow cone end facing in the opposite direction.

According to the invention, moreover, the said outer lateral surfaces 38 and 42 of the outer ring 26 of the bearing 22 and of the frusto-conical sleeve 41, and the inner lateral surface 43 of the frusto-conical sleeve 44 are directly and fixedly connected to the elastomeric sleeve 25 (in particular to respective substantially conical inner and outer lateral surfaces thereof); in such a way that the bearing 22 and the annular support element 24 and 41 form with the sleeve 25 a single substantially inseparable unit, at least if the sleeve 25 itself or another of the elements composing the block 18 are not broken; this intimate and direct connection between the surface 38 and the elastomeric sleeve 25 is obtained in a known way by connecting the sleeve 25 to the surfaces 38, 42 and 43 by adhesion in a vulcanisation stage of the sleeve 25 itself. For example, the element 41 is first mechanically fixed by snap-engaging it to the ring 26 at the edge 44 and groove 39 and then the ring 26 is disposed coaxially to the element 24 and together therewith directly passed to the interior of the forming and vulcanisation mould for the sleeve 25, and then the elastomeric material is injected into the interior of the mould and is there vulcanised in such a way as to ensure the said direct connection between the sleeve 25 and the surfaces 38, 42 and 43 thus forming a unit which, with the addition of the inner ring 23 and the associated rolling bodies 27 in such a way as to complete the bearing 22, gives rise to the block 18 according to the invention; preferably the sleeve 25 is formed in such a way as to be provided with a lower sealing lip 45 which can cooperate slidingly with the end cover 14 in such a way as to prevent the ingress into the block 18 of possible contaminants from the shock absorber 4. The position of the annular groove 39 and the form and length of the sleeve or annular support element 41 are chosen in such a way that this latter defines a conical attachment surface for the rubber, so as to be able to transmit compression-shear stresses to the elastomeric sleeve 25, and to the outer ring 26 rigidly connected thereto, rather than substantially shear stresses as the single ring 26 would transmit if the sleeve or element 41 were absent.

From what has been described the advantages of the present invention will be apparent. It allows a resilient block for attachment of a shock absorber of a front suspension to the body of a vehicle of simple, rapid and economical construction and assembly to be obtained, in which there is no risk of damage to the rolling element bearings of the block following an incorrect assembly due to errors and/or imperfections caused by different working tolerances of the various elements from which the block is made, and in which the elastomeric sleeve can work in better conditions (that is to say substantially under compression-shear). In particular it allows this latter advantage to be obtained due to the presence of the conical attachment surfaces of the resilient sleeve, without the necessity of working the outer ring of the bearing with a tool to obtain a conical surface on it; instead this feature is defined by the inner sleeve element which is of economical construction and reduced weight, and therefore according to the invention resilient blocks of less cost and weight than those of known blocks are obtained.

Finally, from what has been described it will be appreciated that modifications and variations to the resilient block of the present invention can be introduced without departing from the scope of the invention itself.

I claim:

1. A resilient block for the attachment of a shock absorber of a suspension of a vehicle to a body thereof, comprising:
   a. a rolling bearing comprising: an inner ring operable to be fixed to one end of said shock absorber, a cylindrical outer ring shaped like said inner ring and having a cylindrical outer lateral surface, and rolling bodies interposed between the inner and outer rings;
   b. a first frusto-conical sleeve operable to be fixed to said vehicle body;
   c. a second frusto-conical sleeve coaxial with the first sleeve and with said rolling bearing, said cylindrical outer lateral surface of said outer ring of the bearing having attachment means rigidly connecting said outer ring to said second sleeve, said attachment means including an annular groove formed on said cylindrical outer surface of said outer ring, said second sleeve having a circular, radially-directed, inwardly folded rim engaging said annular groove; and d. an elastomeric sleeve for resiliently joining said rolling bearing and said second sleeve to said first sleeve, respective conical inner and outer surfaces of said first and second sleeve, respectively, and said cylindrical outer lateral surface of said outer ring of the rolling bearing being directly and fixedly connected to said elastomeric sleeve to form with said outer ring, said first and second sleeves and said elastomeric sleeve, a single, substantially inseparable unit.

2. A resilient block according to claim 1, wherein said elastomeric sleeve is connected to the outside of said second sleeve, to the inside of said first sleeve and to said outer surface of said outer ring of said bearing by means of vulcanized adhesion upon said elastomeric sleeve.

3. A resilient block according to claim 1, wherein the outer lateral surface and inner lateral surface of said second and first sleeve, respectively, are coaxial and have substantially the same conical angle.

4. A resilient block according to claim 3, further comprising:

a hood of substantially cup-shape form having an attachment flange permitting fixing to said body, said first frusto-conical sleeve being operable to be snap-engaged with said hood.

5. A resilient block according to claim 1, wherein said annular groove is formed on a lower portion of said outer ring of the bearing facing towards said shock absorber, said second frustro-conical sleeve projecting from said lower portion of said outer ring of the bearing in a direction to transmit stresses substantially in compression to said elastomeric sleeve.

* * * * *